United States Patent
Yasunaga et al.

(10) Patent No.: US 8,237,078 B2
(45) Date of Patent: Aug. 7, 2012

(54) MULTIPLE WELDING GUN SYSTEM

(75) Inventors: Norio Yasunaga, Hamamatsu (JP); Mitsuo Munakata, Hamamatsu (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 276 days.

(21) Appl. No.: 12/834,118

(22) Filed: Jul. 12, 2010

(65) Prior Publication Data

US 2011/0017710 A1  Jan. 27, 2011

(30) Foreign Application Priority Data

Jul. 21, 2009  (JP) ................................. 2009-170355

(51) Int. Cl.
- *B23K 9/12* (2006.01)
- *B23K 11/00* (2006.01)
- *B23K 9/28* (2006.01)
- *B23K 9/32* (2006.01)
- *B23K 11/10* (2006.01)
- *B23K 11/30* (2006.01)
- *B23K 37/02* (2006.01)

(52) U.S. Cl. .... 219/78.01; 219/80; 219/86.1; 219/86.21; 219/86.24; 219/86.25; 219/86.33; 219/86.7; 219/87; 219/90

(58) Field of Classification Search .............. 219/78.01, 219/80, 86.1, 86.2, 86.24, 86.25, 86.33, 86.7, 219/87, 90
See application file for complete search history.

(56) References Cited

U.S. PATENT DOCUMENTS

| 5,111,019 | A  | * | 5/1992 | Torii et al. ........................ 219/87 |
| 2007/0175868 | A1 | * | 8/2007 | Christensen et al. ...... 219/86.25 |

FOREIGN PATENT DOCUMENTS

JP  HEI 5-88773  12/1993

* cited by examiner

*Primary Examiner* — David Zarneke

(57) ABSTRACT

A multiple welding gun system includes a plurality of welding guns, simultaneously performing welding operations, mounted to a robot arm of a welding robot and a pitch changing device as a space adjusting device disposed between the plurality of welding guns. The pitch changing device is configured to change a gun pitch so as to adjust a space between the welding guns by rotating one of the welding guns relative to other one of the welding guns to thereby move the welding guns closer to or separate from each other.

6 Claims, 10 Drawing Sheets

FIG. 5

MULTIPLE WELDING GUN SYSTEM

CROSS-REFERENCE TO RELATED APPLICATIONS

The present application claims the benefit of priority to Japanese Patent Application No. 170355/2009 filed 21 Jul. 2009, the contents of which are incorporated herein by reference in their entirety.

BACKGROUND OF THE INVENTION

1. Field of the Invention

The present invention relates to a multiple welding gun system capable of welding a workpiece simultaneously at a plurality portions to be welded by using multiple (a plurality of) welding guns mounted on a robot arm of a single welding robot as a movable mount member.

2. Related Art

In a conventional automotive welding facility, a workpiece is welded spot by spot using a single welding gun mounted on a robot arm of a single welding robot as a mount member to which the welding guns are mounted.

Furthermore, in order to reduce tact time and equipment cost, a multiple welding gun system (two-head welding gun) has been provided performing spot-welding to a workpiece simultaneously at two-point (two-spot) welding portions by using two welding guns mounted on a robot arm of a single welding robot such as disclosed in Patent Document 1 (Japanese Utility Model Laid-Open Publication No. HEI 5-88773).

Furthermore, there is also known a multiple welding gun system (for example, including at least two welding guns) equipped with a pitch changing (space adjusting) device, in which one of welding guns is moved (slid) in parallel with the other one to thereby change a welding pitch (gun-to-gun spacing) of the welding guns.

However, the pitch changing device moving the welding guns in parallel has a complex in structure, and moreover, in order to set a large variable range of the welding pitch, it is necessary to increase parallel movement distance of the welding gun, resulting in increases in size and weight of the welding system accordingly.

Furthermore, with the pitch changing device, in a case where the parallel movement distance of the welding gun is increased, a moment acting on the multiple welding gun system is increased as well, which makes it necessary to increase rigidity of the multiple welding gun system including the pitch changing device. In this viewpoint, it is inevitable to increase the size and weight of the multiple welding gun system.

SUMMARY OF THE INVENTION

The present invention was conceived in consideration of the circumstances mentioned above and an object thereof is to provide a multiple welding gun system with reduced size, dimension and weight.

The above and other objects can be achieved according to the present invention by providing, in one preferred aspect, a multiple welding gun system comprising: a plurality of welding guns; a welding robot including a robot arm to which the welding guns are mounted for simultaneously performing welding operations of the guns; and a pitch changing device disposed between the plurality of welding guns so as to change a gun pitch and adjust a space between the welding guns by rotating one of the welding guns relative to others of the welding guns to thereby move the welding guns closer to or separate from each other.

In preferred examples of the above aspect, it may be preferable that the plurality of welding guns include a fixed welding gun fixed to the robot arm of the welding robot and a movable welding gun rotated with respect to the fixed welding gun by the pitch changing device, and the pitch changing device is fixed to the robot arm of the welding robot, and all of the plurality of welding guns are configured to be rotated through the pitch changing device so as to move closer to or separate from each other.

It may be desired that each of the plurality of welding guns is a spot welding gun in which a welding electrode on the fixed gun side and a welding electrode on the movable gun side are operated to be opened or closed, and the pitch changing device includes a rotating shaft coupled to the welding gun to be rotatable together with the welding gun so as to extend in a direction parallel to a direction of the opening and closing directions of the welding electrodes.

The pitch changing device may further include a motor which applies a rotational force to the rotating shaft directly or via a transmission mechanism.

It is preferable that a plurality of welding guns include two welding guns between which the pitch changing device is disposed.

According to the present invention having the preferred embodiments mentioned above, a small and lightweight multiple welding gun system can be realized and provided by the location of the pitch changing device as a space adjusting device, which moves the welding guns toward or away each other by rotating one of the welding guns relative to others of the welding guns. The pitch changing device can be configured to require a simpler structure and lower rigidity than a conventional device which changes gun-to-gun spacing by moving in parallel multiple welding guns.

The nature and other characteristic features of the present invention will be made clearer from the following descriptions made with reference to the accompanying drawings.

BRIEF DESCRIPTION OF THE DRAWINGS

In the accompanying drawings:

FIG. 5 is a plane view showing how a welding operation is carried out by using the double-gun system shown in FIG. 1;

FIGS. 10A and 10B are plane views showing operation of the double-gun system shown in FIG. 7, in which FIG. 10A shows a state of a rotation servomotor rotated by −10 degrees, and FIG. 10B shows a state thereof rotated by +5 degrees.

DESCRIPTION OF THE PREFERRED EMBODIMENTS

The best mode for carrying out the present invention will be described with reference to the drawings. Further, it is to be noted that the terms "upper", "lower", "right", "left" and the like terms are used herein with reference to illustrations on the accompanying drawings or in an actually usable state of the system.

[First Embodiment (FIGS. 1 to 5)]

Figure 1:
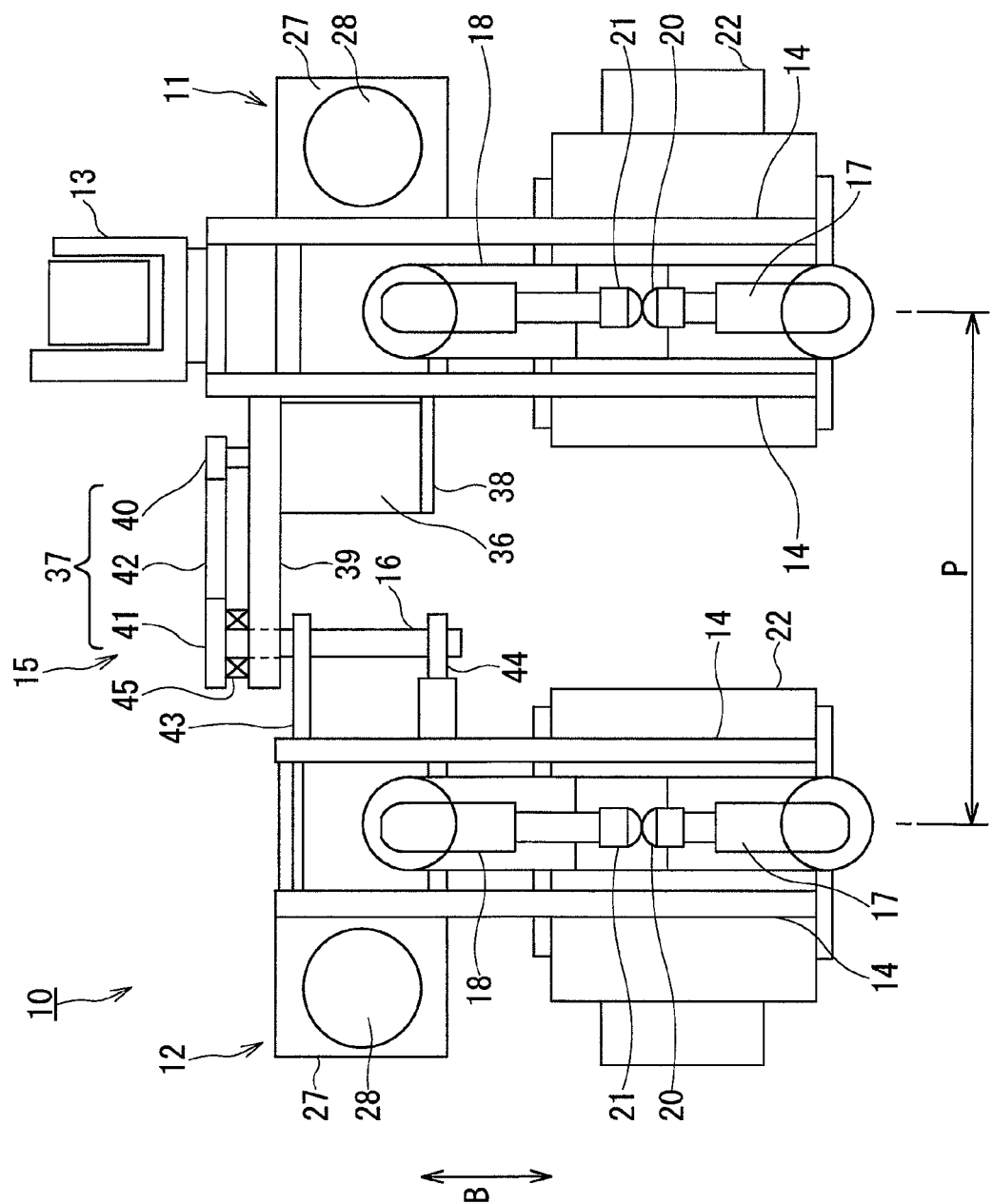
FIG. 1 is an illustrated front view of a double-gun system representing a first embodiment of a multiple welding gun system according to the present invention.

FIG. 1 is a front view of a double-gun system which is a first embodiment of a multiple welding gun system according to the present invention.

Figure 2:
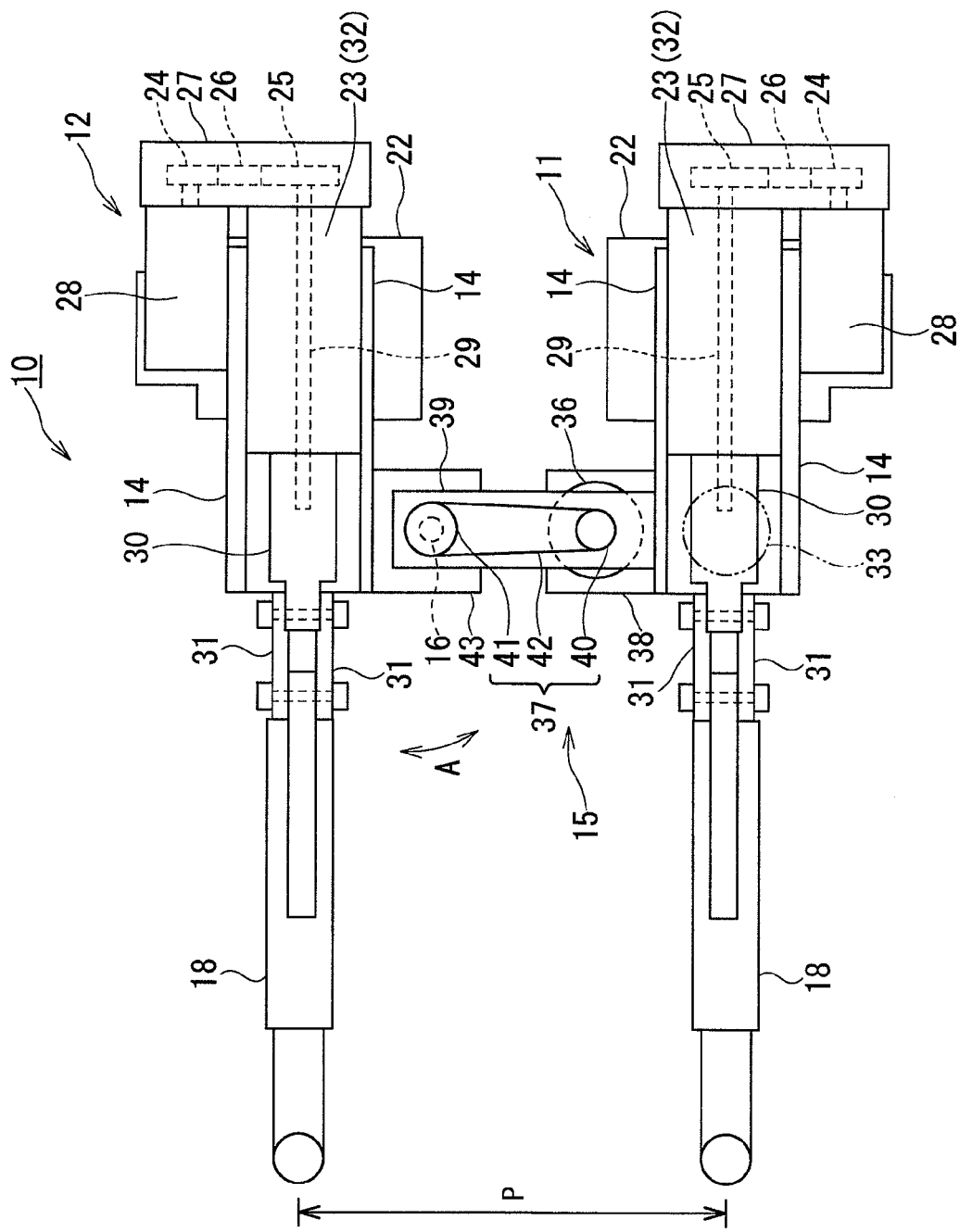
FIG. 2 is a plane view of the double-gun system shown in FIG. 1.
Figure 3:
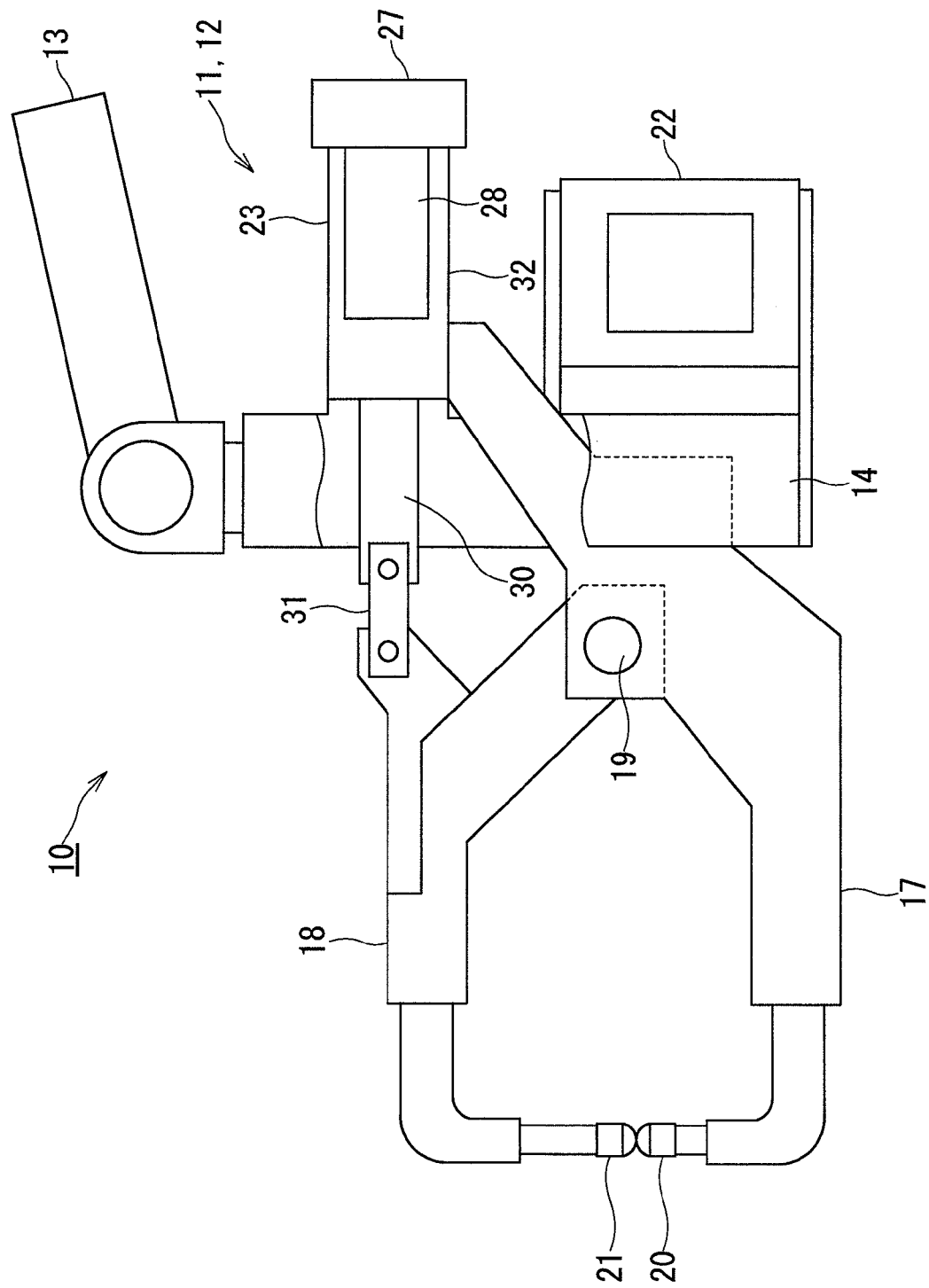
FIG. 3 is a side view of the double-gun system shown in FIG. 1.
Figure 4A:
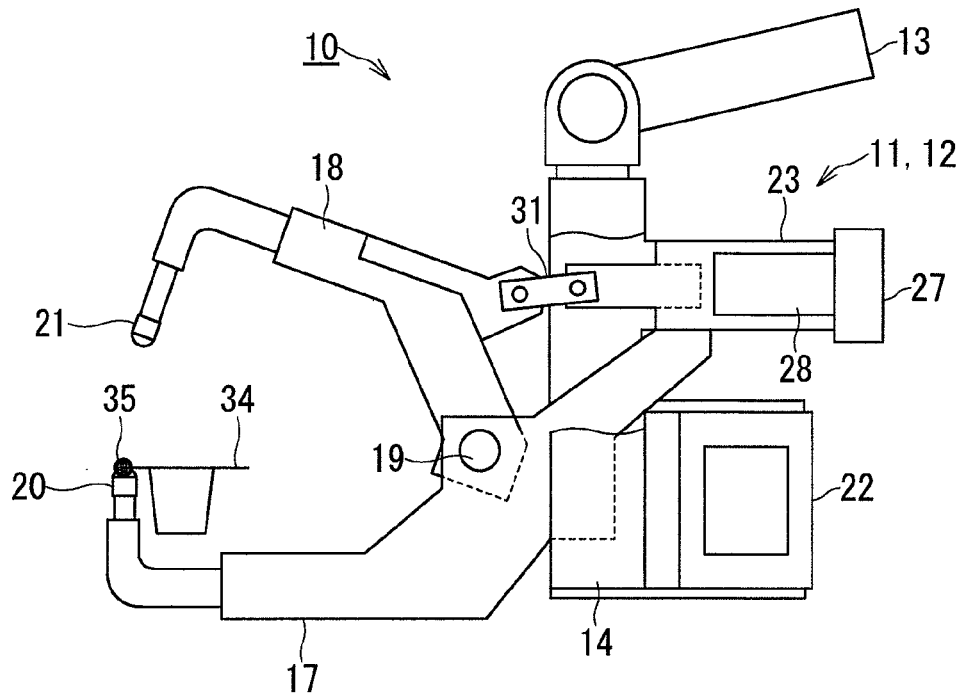
FIGS. 4A and 4B are side views showing how a welding operation is carried out by using the double-gun system shown in FIG. 1.
Figure 4B:
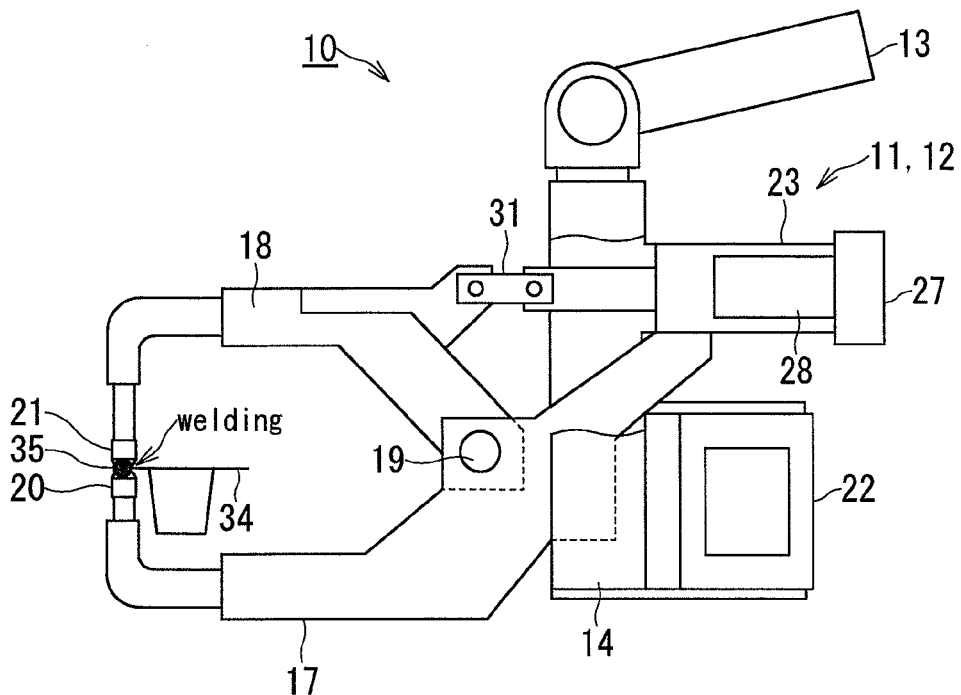

The double-gun system 10 shown in FIGS. 1 to 3 includes a first welding gun 11 and a second welding gun 12 mounted on a robot arm 13 of a welding robot, as a movable mount member, to which the welding guns are mounted (with a load-carrying capacity of 200 kg or less).

The double-gun system 10 is an example of the multiple welding gun system which has multiple (e.g., two) welding guns capable of performing simultaneous welding operations. The first welding gun 11 functions as a fixed welding gun fixed to the robot arm 13 via a frame 14. The second welding gun 12 is a movable welding gun which is rotated around a rotating shaft 16 in a direction of arrow "A" (FIG. 2) with respect to the first welding gun 11 by a pitch changing device (which may be called as a space adjusting device) 15, described hereinlater.

Further, reference numeral 33 in FIG. 2 denotes a robot arm mounting position.

The first welding gun 11 and second welding gun 12 are X-type spot welding guns, as shown in FIG. 3, in which welding electrodes 20 and 21 installed at tip portions of a fixed gun arm 17 and a movable gun arm 18, respectively, are closed and opened when the movable gun arm 18 swings around a pivot shaft 19 with respect to the fixed gun arm 17.

The fixed gun arm 17 is mounted on the frame 14 on which a welding transformer 22 and a ball screw mechanism 23 are installed. The welding transformer 22 supplies welding power to the welding electrodes 20 and 21, and the ball screw mechanism 23 is connected to a pressurizing servomotor 28 via a pulley mechanism 27 as shown in FIG. 2, where the pulley mechanism 27 is made up of a timing belt 26 looped over a driving pulley 24 and a driven pulley 25.

The driving pulley 24 is mounted on a drive shaft of the pressurizing servomotor 28 in a manner to be rotatable together with the drive shaft, and the ball screw 29 of the ball screw mechanism 23 is coupled to the driven pulley 25 in a manner to be rotatable together with the driven pulley 25.

Further, a drive nut 30 is screwed onto the ball screw 29, and the movable gun arm 18 is coupled to the drive nut 30 via a link 31. Furthermore, as shown in FIG. 3, a base end of the fixed gun arm 17 is supported by a casing 32 of the ball screw mechanism 23.

Accordingly, when the pressurizing servomotor 28 operates, the ball screw 29 of the ball screw mechanism 23 is rotated via the driving pulley 24, the timing belt 26 and the driven pulley 25 of the pulley mechanism 27, the drive nut 30 moves along an axis of the ball screw 29, the movable gun arm 18 swings around the pivot shaft 19 with respect to the fixed gun arm 17, and the welding electrode 21 on the movable gun arm 18 is operated to be opened or closed with respect to the welding electrode 20 on the fixed gun arm 17.

When the welding electrode 21 on the movable gun arm 18 is opened with respect to the welding electrode 20 on the fixed gun arm 17 (FIG. 4A), the welding electrodes 20 and 23 do not perform any spot welding with respect to a portion 35 of a work (workpiece) 34 to be welded. On the other hand, when the welding electrode 21 on the movable gun arm 18 is closed with respect to the welding electrode 20 on the fixed gun arm 17 (FIG. 4B), the welding electrodes 20 and 21 perform the spot welding to the weld portion 35 of the workpiece 34.

As shown in FIGS. 1 and 2, the pitch changing device 15, placed between the first welding gun 11 and the second welding gun 12, rotates the second welding gun 12 in the direction of the arrow "A" with respect to the first welding gun 11. According to this motion, the tip portion of the second welding gun 12 is moved closer to or separate (further) from the tip portion of the first welding gun 11, thereby changing the gun pitch (gun-to-gun spacing or weld pitch) P between the tip portions of the first welding gun 11 and the second welding gun 12.

The pitch changing device (space adjusting device) 15 includes the rotating shaft 16, a rotation servomotor 36 serving as a drive motor, and a transmission mechanism 37.

The rotation servomotor 36 is supported by the frame 14 of the first welding gun 11 via a mounting bracket 38 and a supporting arm 39 standing on the frame 14. The transmission mechanism 37 includes a driving pulley 40 coupled to a rotating shaft of the rotation servomotor 36 in such a way as to rotate together with the rotating shaft, a driven pulley 41 coupled to an end of the rotating shaft 16 in such a way as to rotate together with the rotating shaft 16, and a timing belt 42 looped over the driving pulley 40 and driven pulley 41.

The rotating shaft 16 vertically extends along an opening/closing direction (direction of arrow "B" in FIG. 1) of the welding electrodes 20 and 21 of the second welding gun 12 in a manner of penetrating the supporting arm 39, and is coupled to an upper bracket 43 and a lower bracket 44 extending horizontally from (standing on) the frame 14 of the second welding gun 12 to be rotatable together with the upper and lower brackets 43 and 44. A bearing member such as a thrust bearing 45 is mounted around the rotating shaft 16 located between the driven pulley 41 and supporting arm 39.

The rotating shaft 16 and the driven pulley 41 are arranged rotatably with respect to the supporting arm 39 via the thrust bearing 45. A load of the second welding gun 12 is supported by the supporting arm 39 via the upper bracket 43, the lower bracket 44, the rotating shaft 16, the driven pulley 41, and the thrust bearing 45.

Figure 5:
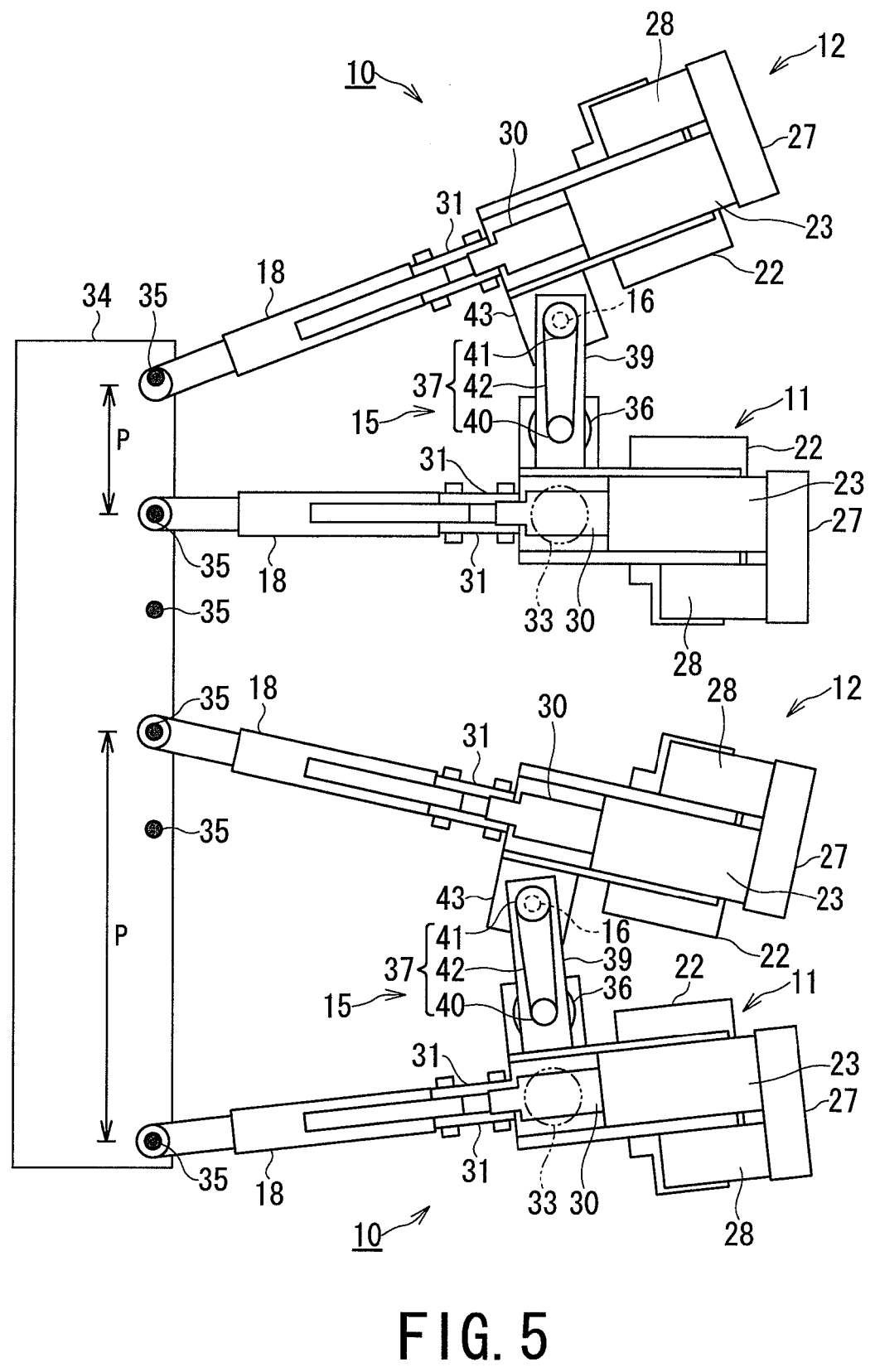

As shown in FIG. 5, portions or locations 35 of the workpiece 34 are not arranged at even spaces or intervals, which are different depending on the shape or like of the workpiece 34. Thus, the rotation servomotor 36 of the pitch changing device 15 is operated, and a rotational force of the rotation servomotor 36 is applied to the rotating shaft 16 via the driving pulley 40, the timing belt 42 and the driven pulley 41 of the transmission mechanism 37, thereby rotating the second welding gun 12 around the rotating shaft 16 in the direction of the arrow "A" with respect to the first welding gun 11 so as to change and adjust the gun pitch or weld pitch (gun-to-gun spacing) "P" between the first welding gun 11 and second welding gun 12 to thereby bring the respective welding electrodes 20 and 21 of the first welding gun 11 and second welding gun 12 into coincidence with an interval between the weld locations 35 on the workpiece 34. Furthermore, the respective welding electrodes 20 and 21 of the first welding gun 11 and second welding gun 12 are positioned at the weld locations 35 on the workpiece 34 by moving the robot arm 13. In this state, the double-gun system 10 performs the spot welding simultaneously at the two weld locations 35 on the workpiece 34 by using the first welding gun 11 and second welding gun 12.

According to the first embodiment of the structures and characters mentioned above, the following advantageous effects (1) to (3) will be attained.

(1) Since the chip changing device 15 rotates the second welding gun 12 with respect to the first welding gun 11, the tip portions of the welding guns 11 and 12 closer to or separate from each other, thereby changing the gun pitch (gun-to-gun spacing) P between the tip portions of the first welding gun 11 and the second welding gun 12. Accordingly, in comparison with a conventional tip changing device or a spacing adjustment device which changes gun-to-gun spacing (gun pitch or welding pitch) by parallely moving the multiple welding guns, since it is not necessary for the double-gun system 10 to increase the parallel moving distance of the welding gun, the present embodiment requires a simplified structure and requires reduced rigidity because there are not significant changes in moment. Thus, the present embodiment can provide a small and lightweight double-gun system 10, which can be mounted on the robot arm 13 of a welding robot well within the load-carrying capacity of the welding robot, and increase an adjustment range of the gun-to-gun spacing P.

(2) An angle of approach of the second welding gun 12 to the workpiece 34 is changed when the second welding gun 12 is rotated by the pitch changing device 15. This makes it possible to prevent the second welding gun 12 from interfering with the workpiece 34, thereby performing the spot welding suitably even if the portions 35 to be welded are located in corners of an opening of the workpiece 34.

(3) By changing diameter of the driving pulley 40 of the transmission mechanism 37 relative to the driven pulley 41, the pitch changing device 15 can adjust speed of change of the gun-to-gun spacing P between the first welding gun 11 and the second welding gun 12.

[Second Embodiment (FIG. 6)]

Figure 6:
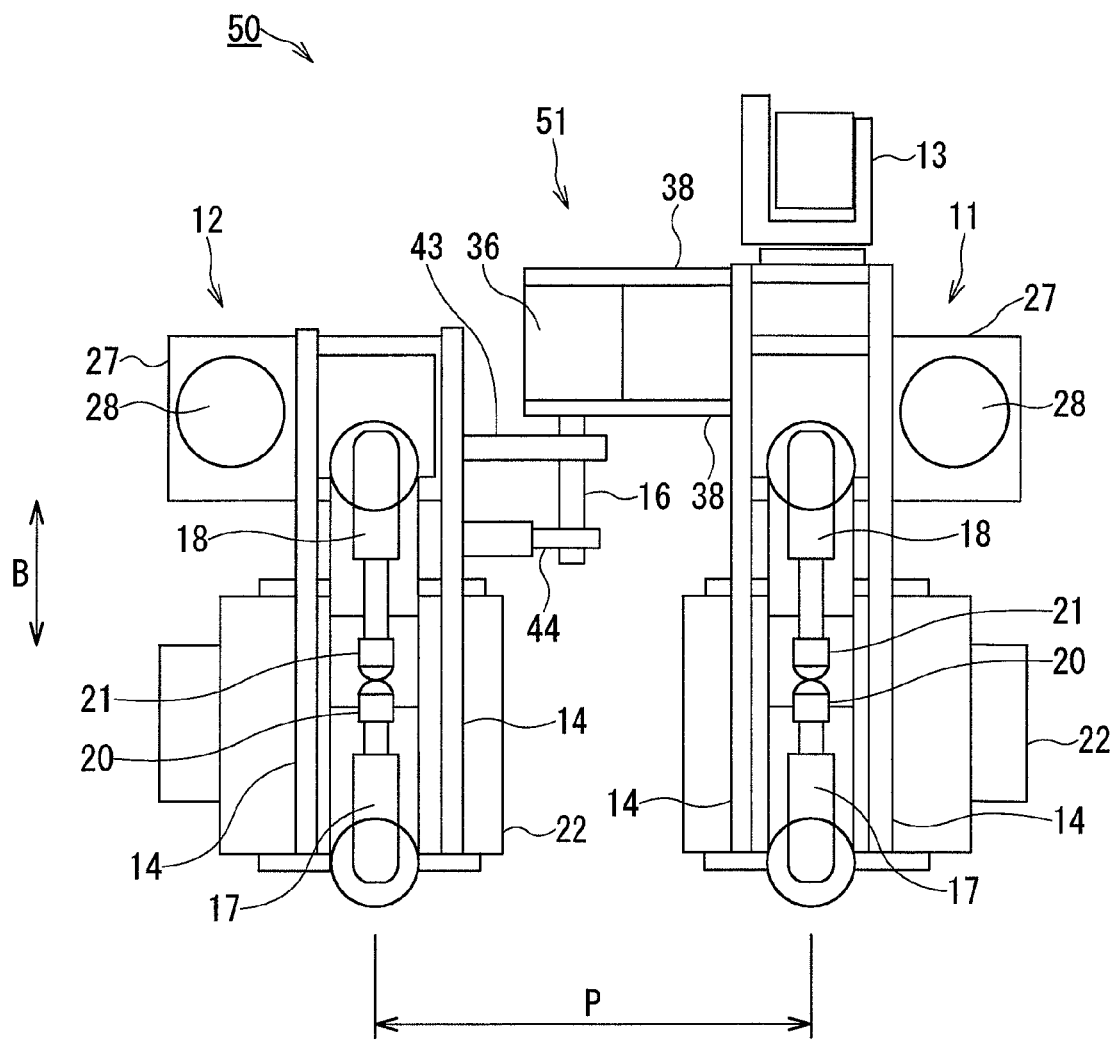
FIG. 6 is an illustrated front view of a double-gun system representing a second embodiment of the multiple welding gun system according to the present invention.

FIG. 6 is a front view of a double-gun system representing a second embodiment of the multiple welding gun system according to the present invention. In the second embodiment, the like reference numerals are added to portions or members corresponding to those in the first embodiment, and repeated description thereof will be simplified or omitted herein.

The double-gun system 50 which is a multiple welding gun system according to the present embodiment differs from the double-gun system 10 according to the first embodiment in that the rotation servomotor 36 of the pitch changing device 51 is connected directly to the rotating shaft 16 without intervening the transmission mechanism 37. That is, the rotating shaft 16 is connected directly to a motor shaft of the rotation servomotor 36 and a rotational force of the rotation servomotor 36 is transmitted to the second welding gun 12 via the rotating shaft 16, the upper bracket 43 and the lower bracket 44.

Thus, the present embodiment provides the following advantageous effect (4) in addition to the advantageous effects (1) and (2) of the first embodiment.

(4) Since the rotation servomotor 36 of the pitch changing device 51 is connected directly to the rotating shaft 16, it is not necessary for the transmission mechanism 37 to be arranged, thus further simplifying structure of the double-gun system 50.

[Third Embodiment (FIGS. 7 to 10)]

Figure 7:
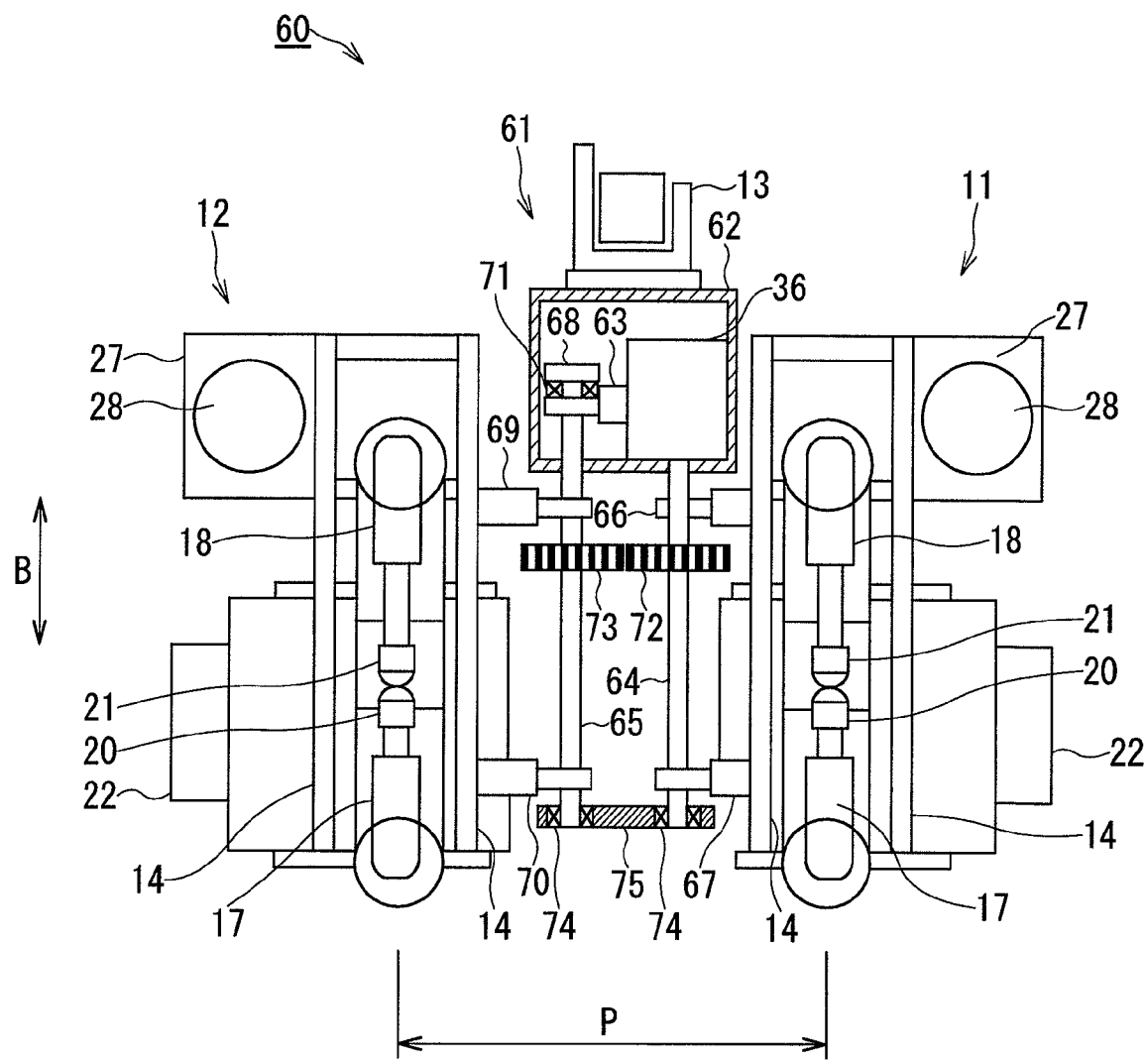
FIG. 7 is a front view, partially in section, of a double-gun system representing a third embodiment of the multiple welding gun system according to the present invention.
Figure 8:
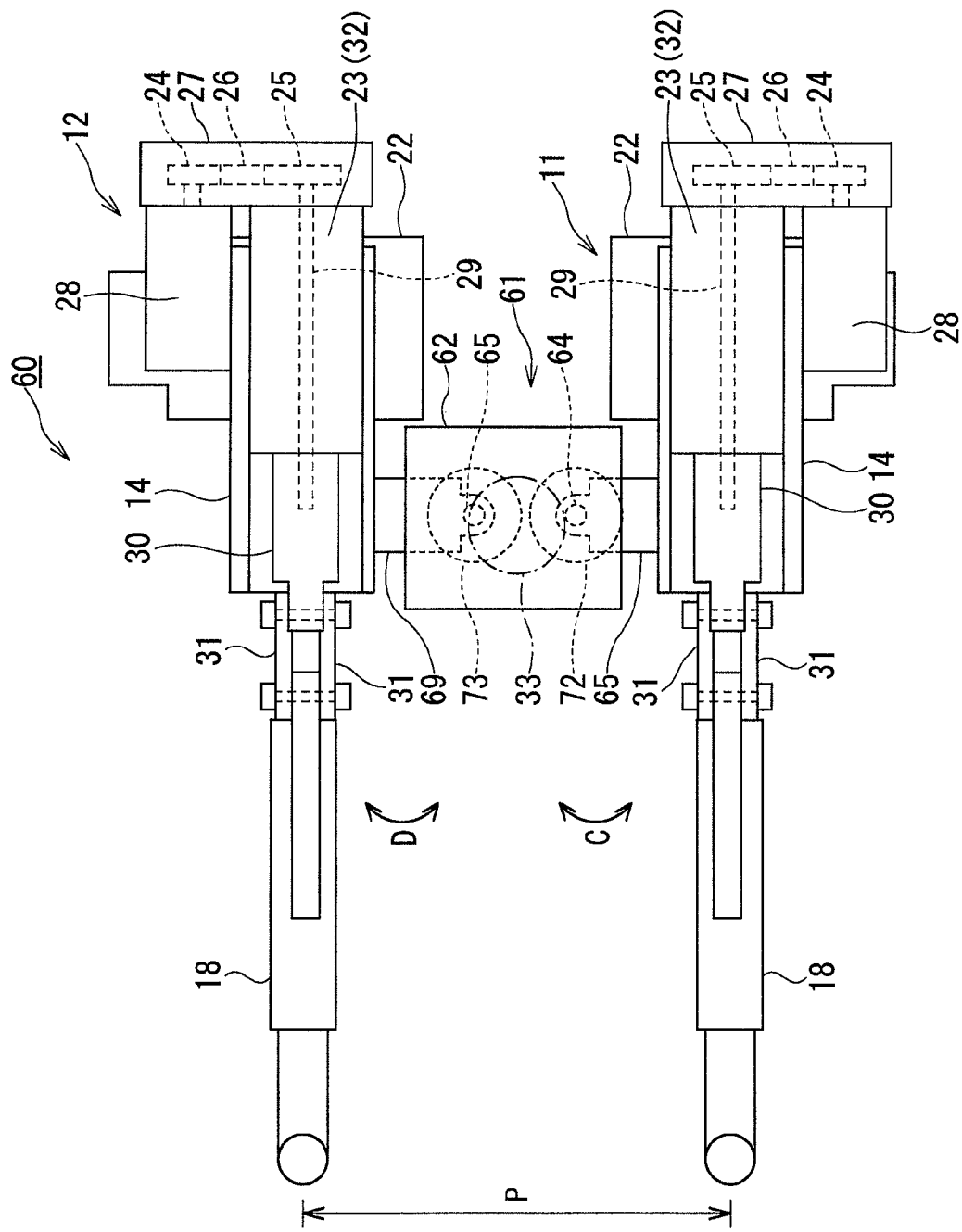
FIG. 8 is a plane view of the double-gun system shown in FIG. 7.
Figure 9:
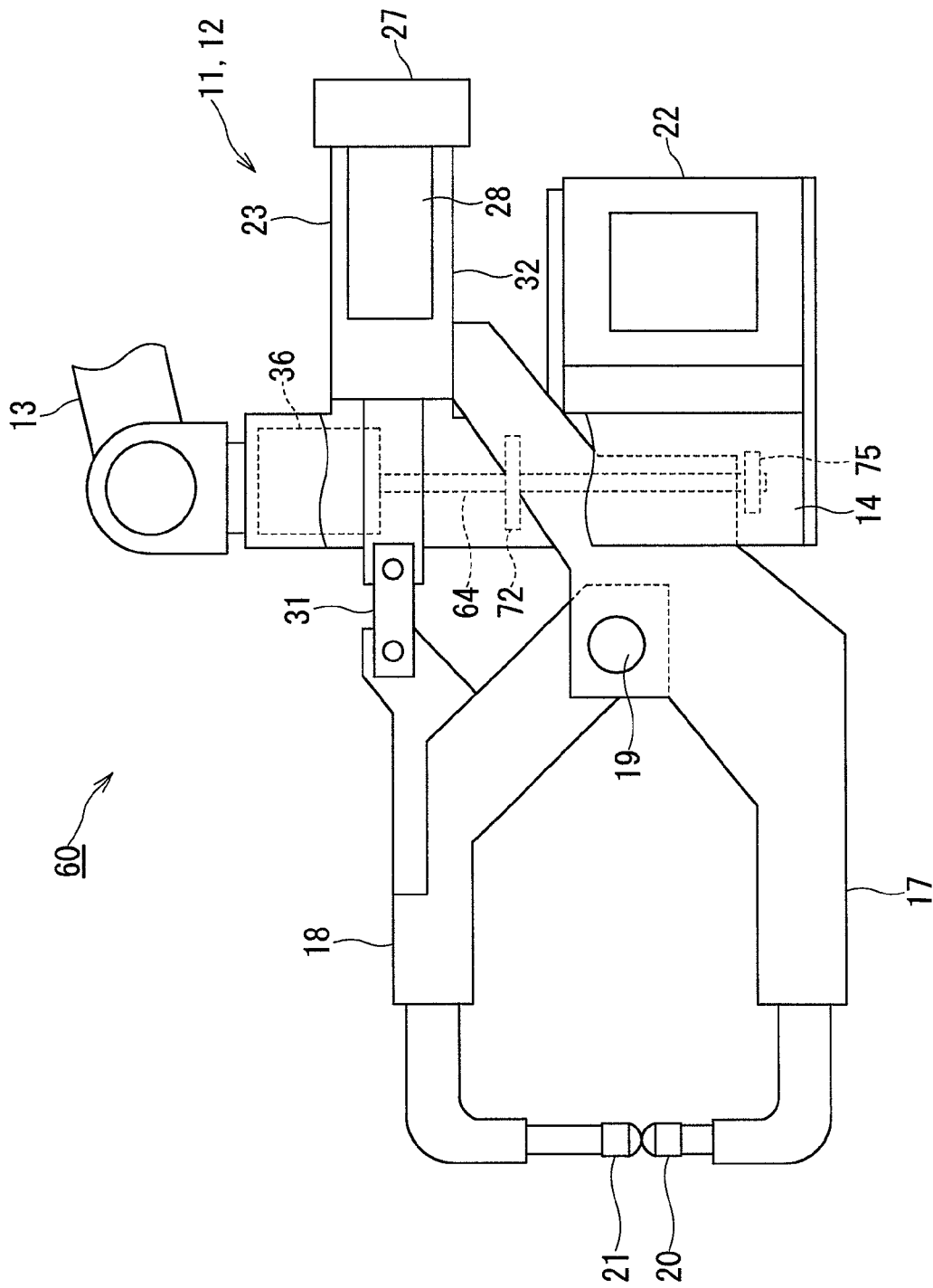
FIG. 9 is a side view of the double-gun system shown in FIG. 7.

FIG. 7 is a front view and partial sectional view of a double-gun system representing a third embodiment of the multiple welding gun system according to the present invention. In the third embodiment, the like reference numerals are added to portions or members corresponding to those in the first embodiment, and repeated description thereof will be simplified or omitted herein.

The double-gun system 60 which is a multiple welding gun system according to the present embodiment differs from the double-gun system 10 according to the first embodiment in that a pitch changing (i.e., space adjusting) device 61 is fixed to the robot arm 13 of the welding robot and that both the first welding gun 11 and second welding gun 12 are mounted to be rotatable via the pitch changing device 61, allowing the tip portions of the first welding gun 11 and the second welding gun 12 to move closer to or separate from each other in order to change the gun pitch (i.e., gun-to-gun spacing) P between the tip portions of the first welding gun 11 and the second welding gun 12.

Specifically, the pitch changing device 61 includes a rotation servomotor 36 installed in a box-shaped housing 62 and a mounting bracket 63 secured to a side wall of the rotation servomotor 36. The robot arm 13 of the welding robot is fixed to a top surface of the housing 62.

A first rotating shaft 64 is coupled to the motor shaft of the rotation servomotor 36 in a manner to be rotatable together with the motor shaft. The first rotating shaft 64 extends along an opening/closing direction (direction of arrow "B" in FIG. 7) of the respective welding electrodes 20 and 21 on the fixed and movable gun arms 17 and 18 of the first welding gun 11, and the first rotating shaft 64 is also coupled to an upper bracket 66 and the lower bracket 67 horizontally erected from the frame 14 of the first welding gun 11 so as to be rotatable together with the upper and lower brackets 66 and 67. Accordingly, when the rotation servomotor 36 is operated, the first welding gun 11 is rotated around the first rotating shaft 64 in a direction of arrow "C" in FIG. 8.

A second rotating shaft 65 is disposed so as to penetrate the mounting bracket 63 to be rotatable and provided with a supporting disk 68 fixed to one end thereof. The second rotating shaft 65 extends along an opening/closing direction (direction of arrow "B" in FIG. 7) of the respective welding electrodes 20 and 21 on the fixed gun arm 17 and movable gun arm 18 of the second welding gun 12, and is coupled to an upper bracket 69 and a lower bracket 70 horizontally erected on the frame 14 of the second welding gun 12 in a manner to be rotatable together with the upper and lower brackets 69 and 70.

A bearing member such as a thrust bearing 71 is installed around a portion of the second rotating shaft 65 surrounded by the supporting disk 68 and mounting bracket 63. The second rotating shaft 65 and the supporting disk 68 are installed rotatably with respect to the mounting bracket 63 via the thrust bearing 71. Further, a load of the second welding gun 12 is supported by the mounting bracket 63 via the upper bracket 69, the lower bracket 70, the second rotating shaft 65, the supporting disk 68, and the thrust bearing 71. Furthermore, lower ends of the first rotating shaft 64 and the second rotating shaft 65 are supported by a positioning plate 75 via a bearing member such as a radial bearing 74. The positioning plate 75 keeps an interval between the first rotating shaft 64 and the second rotating shaft 65 constant.

Furthermore, a driving gear 72 is mounted on the first rotating shaft 64 so as to be rotatable together with the first rotating shaft 64, and a driven gear 73 is mounted on the second rotating shaft 65 also so as to be rotatable together with the second rotating shaft 65. The driving gear 72 and the driven gear 73 are meshed together, and the rotational force of the rotation servomotor 36 is transmitted in a manner such that when the first rotating shaft 64 is rotated, the second rotating shaft 65 is also rotated rotate in an opposite direction. Therefore, when the rotation servomotor 36 is operated, the first welding gun 11 is rotated around the first rotating shaft 64 in the direction of arrow "C" (FIG. 8) and the second welding gun 12 is rotated around the second rotating shaft 65 in a direction of arrow "D" (FIG. 8), i.e., in a direction opposite to that of the first welding gun 11, under the action of the driving gear 72 and the driven gear 73.

Figure 10A:
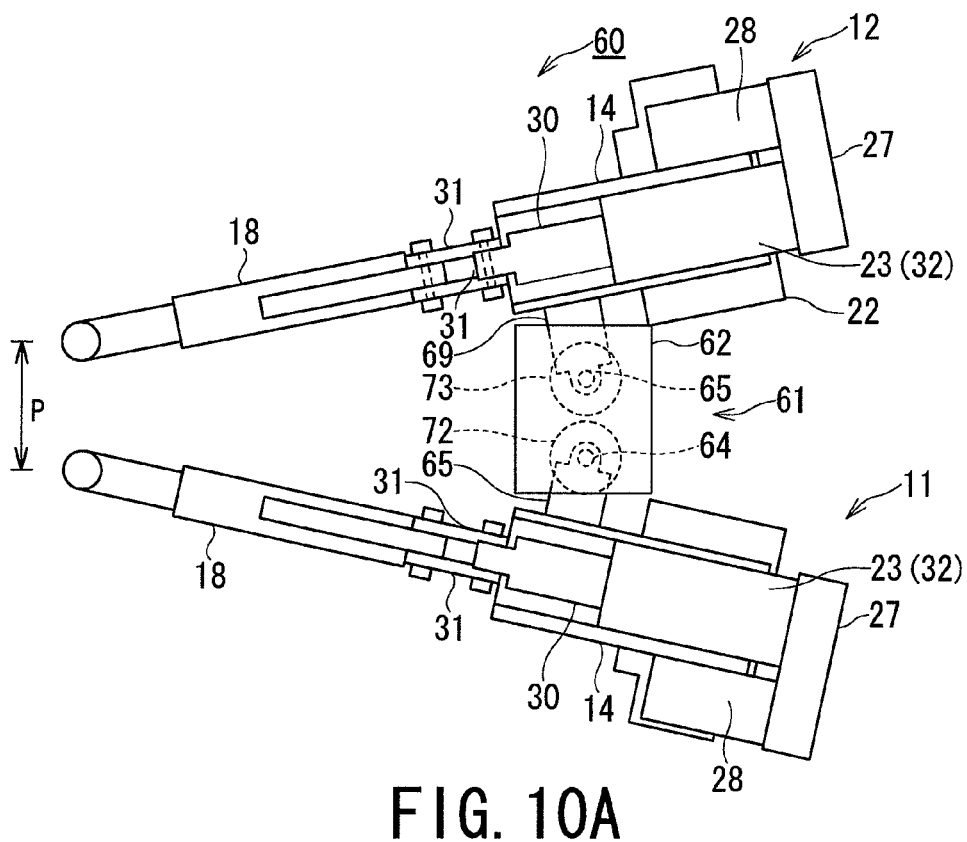

As shown in FIG. 10A, when the rotation servomotor 36 is rotated, for example, by −10 degrees, the first welding gun 11 is rotated around the first rotating shaft 64 and the second welding gun 12 is also rotated around the second rotating shaft 65 in directions opposing to each other. Accordingly, the tip portions of the first and second welding guns 11 and 12 are move closer to each other, reducing the gun-to-gun spacing (gun pitch) P between the tip portions of the first and second welding guns 11 and 12.

Figure 10B:
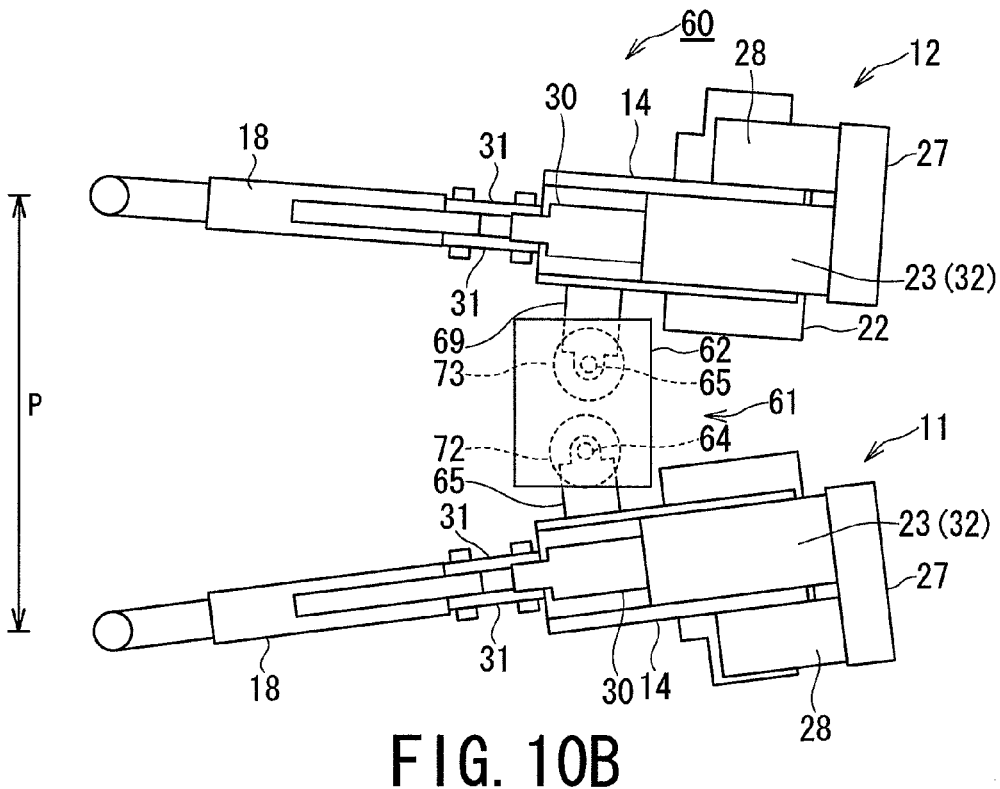

On the other hand, as shown in FIG. 10B, when the rotation servomotor 36 is rotated, for example, by +5 degrees, the first welding gun 11 is rotated around the first rotating shaft 64 and the second welding gun 12 is rotated around the second rotating shaft 65 in the directions opposing to each other. Accordingly, the tip portions of the first and second welding guns 11 and 12 are moved move away from each other, thus increasing the gun-to-gun spacing P between the tip portions of the first and second welding guns 11 and 12.

In the manner mentioned above, by changing the gun-to-gun spacing P between the tip portions of the first welding gun 11 and the second welding gun 12 and adjusting the positions thereof by using the robot arm 13, the respective welding electrodes 20 and 21 of the first welding gun 11 and the second welding gun 12 are moved so as to be coincident with the portions 35 to be welded of the workpiece 34, and the spot welding is then performed simultaneously at the welding locations 35.

As described above, according to the structure of the present third embodiment, the following advantageous effect (5) can be attained in addition to the advantageous effect (2) of the first embodiment.

(5) In the double-gun system 60 according to the present embodiment, the pitch changing device 61 rotates the first welding gun 11 and the second welding gun 12, thereby moving the tip portions of the first and second welding guns 11 and 12 closer to or separate from each other, thus changing the gun-to-gun spacing (gun pitch) P between the tip portions of the first welding gun 11 and the second welding gun 12. This simplifies the structure of the double-gun system 60 and allows rigidity of the double-gun system 60 to be reduced, reducing the size and weight of the device and system. Accordingly, the double-gun system 60 of the present invention can be mounted on the robot arm 13 of the welding robot, as a mount member, to which the welding guns are mounted within the load-carrying capacity of the welding robot and an adjustment range of the gun pitch P can be increased.

It is to be noted that although the present invention has been described above with reference to the preferred embodiments, the present invention is not limited to these embodiments, and many other changes and modifications may be made without departing from the scopes of the appended claims.

For example, although the double-gun systems 10, 50 and 60 equipped with the first welding gun 11 and the second welding gun 12 have been described as the preferred embodiment hereinabove, the present invention is also applicable to a multiple welding gun system equipped with three or more welding guns.

Furthermore, although in the above embodiment, the first welding gun 11 and the second welding gun 12 are described as the X-type spot welding guns in which the movable gun arm 18 swings around the pivot shaft 19 with respect to the fixed gun arm 17, the present invention is also applicable to C-type spot welding guns in which the movable gun arm 18 moves linearly with respect to the fixed gun arm 17 as well as to arc welding guns.

Still furthermore, instead of welding guns, the present invention is also applicable to a system in which multiple filler injection guns or screw tighteners such as bolt runners or nut runners are mounted on a robot arm of an industrial robot.

What is claimed is:

1. A multiple welding gun system comprising:
a plurality of welding guns;
a welding robot including a robot arm to which the welding guns are mounted for simultaneously performing welding operations thereof; and
a pitch changing device disposed between the plurality of welding guns so as to change a gun pitch and adjust a space between the welding guns by rotating one of the welding guns relative to others of the welding guns to thereby move the welding guns closer to or separate from each other.

2. The multiple welding gun system according to claim 1, wherein the plurality of welding guns include a fixed welding gun fixed to the robot arm of the welding robot and a movable welding gun rotated with respect to the fixed welding gun by the pitch changing device.

3. The multiple welding gun system according to claim 1, wherein the pitch changing device is fixed to the robot arm of the welding robot, and all of the plurality of welding guns are configured to be rotated through the pitch changing device so as to move closer to or separate from each other.

4. The multiple welding gun system according to claim 1, wherein each of the plurality of welding guns is a spot welding gun in which a welding electrode on the fixed gun side and a welding electrode on the movable gun side are operated to be opened or closed, and the pitch changing device includes a rotating shaft coupled to the welding gun to be rotatable together with the welding gun so as to extend in a direction parallel to a direction of the opening and closing directions of the welding electrodes.

5. The multiple welding gun system according to claim 4, wherein the pitch changing device further includes a motor which applies a rotational force to the rotating shaft directly or via a transmission mechanism.

6. The multiple welding gun system according to claim 1, wherein a plurality of welding guns include a pair of two welding guns between which the pitch changing device is disposed.

* * * * *